United States Patent [19]

Miyamoto

[11] Patent Number: 5,338,769

[45] Date of Patent: Aug. 16, 1994

[54] PHOTO-CURABLE RESIN COMPOSITION

[75] Inventor: Ryoichi Miyamoto, Kyoto, Japan

[73] Assignee: Mitsui Petrochemical Industries, Ltd., Tokyo, Japan

[21] Appl. No.: 833,744

[22] Filed: Feb. 11, 1992

[30] Foreign Application Priority Data

| Feb. 12, 1991 | [JP] | Japan | 3-038867 |
| Feb. 12, 1991 | [JP] | Japan | 3-038868 |
| Feb. 12, 1991 | [JP] | Japan | 3-038869 |
| Feb. 12, 1991 | [JP] | Japan | 3-038870 |
| Feb. 12, 1991 | [JP] | Japan | 3-038871 |

[51] Int. Cl.$^5$ .............. C08F 2/50; C08L 3/02
[52] U.S. Cl. .................. 522/88; 522/100; 522/102; 522/109; 522/111; 522/121; 522/123; 522/142; 522/908; 523/109
[58] Field of Search ........... 523/109, 120; 522/80, 522/79, 74, 72, 163, 88, 100, 102, 109, 111, 121, 123, 142, 908, 157, 161; 525/67

[56] References Cited

U.S. PATENT DOCUMENTS

| 4,228,062 | 10/1980 | Lee, Jr. et al. | 525/286 |
| 4,264,752 | 4/1981 | Watson, Jr. | 522/97 |
| 4,340,529 | 7/1982 | Lee, Jr. et al. | 524/116 |
| 4,397,982 | 8/1983 | Boutni et al. | 524/504 |
| 4,698,373 | 10/1987 | Tateosian et al. | 522/102 |
| 4,937,173 | 6/1990 | Kanda et al. | 522/102 |
| 5,008,300 | 4/1991 | Makino et al. | 522/908 |
| 5,037,473 | 8/1991 | Antonucci et al. | 523/109 |
| 5,266,609 | 11/1993 | Hall et al. | 523/116 |

FOREIGN PATENT DOCUMENTS

| 0384729 | 8/1990 | European Pat. Off. . |
| 2160650 | 6/1973 | France . |

OTHER PUBLICATIONS

Hawley, *Condensed Chemical Dictionary*, 10 Edition, p. 118.

*Primary Examiner*—Susan Berman
*Attorney, Agent, or Firm*—Sherman and Shalloway

[57] ABSTRACT

A photo-curable resin composition containing a polycarbonate having a number average molecular weight of between 200 and 10,000 and containing at least two (meth)acrylate groups in the molecule, or a diglycidyl phthalate (meth)acrylate, an organic polymer fine powder having an average particle diameter of between 1 $\mu$m and 50 $\mu$m and a photo-radical polymerization initiator; and a coating liquid to be applied to a resin pattern. This resin composition is useful for preparing a clasp pattern exhibiting a theoretical form for retention, durability, etc., i.e., a cast clasp basic pattern, for producing, by a lost wax method, a cast clasp which is a metal component for holding a partial denture, retaining it and supporting it.

15 Claims, No Drawings

PHOTO-CURABLE RESIN COMPOSITION

DETAILED DESCRIPTION OF THE INVENTION

The present invention relates to a photo-curable resin composition. More specifically, it relates to a photo-curable resin composition suitably usable for preparing a clasp pattern exhibiting a theoretical form for retention, durability, etc., i.e., a cast clasp basic pattern, for producing, by a lost wax method, a cast clasp which is a metal component for holding a partial denture (resistance to lateral movement), retaining it (resistance to insertion and removal) and supporting it (resistance to a occlusal pressure), and it also relates to improvements related thereto.

In ninety percent or more cases, a clasp is used as a main or indirect retainer for a partial denture. At present, however, the method for producing a cast clasp in particular is complicated, and its retention strength and fitness and the form of its arm portion are not always satisfactory.

A conventional cast clasp is produced as follows. At first, a jaw impression in the buccal cavity of a patient is taken, and a master cast of super hard gypsum, etc., is prepared. Then, for designing a clasp which is a retainer, a retaining teeth portion in the master cast is surveyed. The "survey" refers to the act of determining maximum contour portions of a residual tooth and a residual ridge and examining the mutual parallelism thereof, and in producing a denture, the survey is very important for determining the direction of insertion and removal of the denture, determining a retaining teeth, designating a block-out portion, measuring an undercut amount, and determining a clasp position.

The important factors which influence the retention strength of a clasp are the length, size and cross-sectional form of a clasp arm, the Young's modulus of an alloy used, the undercut amount determined, and the curvature of a retaining teeth surface.

When a cast clasp is produced by use of a paraffin wax pattern, the retention strength of the clasp can be controlled by selecting an undercut amount, a size of the pattern, and a profile. And when the survey is conducted and a denture is designed, it is required to design a clasp according to the state of a periodontal tissue of retaining teeth.

After the designing on the master cast and the block-out are finished, an impression of the retaining teeth portion which has been blocked out according to the designing is taken again (double impression) to prepare a wax pattern for a cast clasp, and an investing model is prepared from super hard gypsum. Then, an accurate controlling of the retention strength of a cast clasp being taken into consideration, a clasp pattern of a paraffin wax is attached to the investing model with an adhesive while it is manually bent, thereby to form a rest portion and a sitting portion and conduct a setting of a sprue. Thereafter, the clasp pattern of a paraffin wax on the investing model is invested in a casting investment without removing the clasp pattern from the investing model. After the investment is cured, the paraffin clasp pattern is heated and fired in a furnace. Then, a molten metal is cast into the resultant clasp pattern mold and cooled, and the metal is taken out by breaking the mold and polished to complete the cast clasp pattern (the above method is referred to as an "investment-with-model method" hereinafter).

The above method for producing a cast clasp involves the following problems in that the material which forms the clasp pattern is a paraffin wax.

(1) Since a paraffin wax cannot undergo elastic deformation at all, and undergoes plastic deformation, a clasp pattern cannot be taken out of a master cast in the course from the undercut portion of retaining teeth to a maximum contour portion.

When the clasp pattern is taken out forcibly, it undergoes permanent deformation, and no accurate fitness can be obtained. For this reason, no cast clasp having controlled retention strength can be produced. Therefore, the production of a clasp pattern of a paraffin wax inevitably requires the abovedescribed investment-with-model method comprising the steps of taking an impression of a master cast, further taking a double impression of an investing model, forming a clasp pattern on the investing model, and investing the investing model with the clasp pattern formed thereon in a casting investment. As a result, the process for the production of the clasp is complicated, and the production takes a long time and requires a high material cost.

(2) Since a clasp pattern of a paraffin wax by itself does not adhere to an investing model and gypsum, it is required to use a specific adhesive. As a result, the resultant clasp has an error of about 50 $\mu$m equivalent to the adhesive thickness, and no clasp having excellent fitness can be obtained.

(3) A clasp pattern of a paraffin wax is manually attached to an investing model under pressure and with an adhesive. Since the investing model has low strength, particles of the investing model peel off during this process to deteriorate the form and surface condition of a retaining teeth portion. The particles of the investing model which have peeled off adhere to the clasp pattern of a paraffin wax, and it is therefore difficult to produce a cast clasp having a satisfactory surface condition.

(4) Paraffin wax which forms a clasp pattern is a polymer having high crystallinity and a relatively low molecular weight, and it has a glass transition temperature Tg and a melting point Tm which are very close to each other or has no glass transition point, like a metal. Therefore, if the rate of temperature increase during the heating and firing of the wax is too high, the molten wax boils, and the gasified wax expands. As a result, an investment is rapidly pressed, and a crack sometimes occurs or the investment has a rough inner surface.

On the other hand, there is another method in which a pattern-forming resin is used in place of a pattern-forming wax. The pattern-forming resin refers to a instantaneously polymerizable resin of a polymethyl methacrylate, which has higher elasticity than a pattern-forming wax but is slow in curing and still insufficient in elasticity. Therefore, when a pattern formed of the resin is taken out through the undercut portion of a master cast within an operation time, a pattern of the resin also undergoes permanent deformation similar to that of a pattern of the wax.

Further, a rapidly curable pattern resin might be obtained by replacing the chemically polymerizable compound with a photo-polymerizable compound. Japanese Laid-Open Patent Publication No. 110609/1989 discloses a pattern-forming, photo-polymerizable resin composition which is a solid at room temperature and has at least one ethylenically unsaturated double bond.

The above Laid-Open Publication describes the operability, strength and castability of the resin composition. However, the operability and castability thereof are not always sufficient.

When a resin pattern prepared from the resin composition disclosed in the above Japanese Laid-Open Patent Publication No. 110609/1989 is invested in a gypsum investment, heated and fired, the gypsum investment is caused to have a rough inner surface. Eventually, the resultant product obtained by casting has a very rough surface and cannot be practically used. An improvement in the above art has been conventionally desired, but has not been achieved yet.

The above description is concerned in the lost wax method in the dental field, and its technical problems are as described above. However, the lost wax method is widely used not only in the dental field but also other general industrial fields, and similar problems arise in other general industrial fields.

In general, a wax or polymethyl methacrylate has been conventionally used as a material for a pattern which is fired while it is invested in a non-combustible investment such as gypsum. However, the defect with a wax is that it is deformed when used in an undercut portion, and the defect with polymethyl methacrylate is that its curing is slow. To overcome these defects, a rapidly curable acrylic resin has taken the place of the above materials. However, when a pattern formed of a rapidly curable, polyfunctional acrylic resin is fired in an investment, the pattern expands before its decomposition, and the surface of the investment is caused to be rough.

Further, in recent years, photo-curable materials have found their use in a variety of fields. Photo-curable compositions are excellent in operability over conventional cold-curing materials. Naturally, however, a curing generally takes place only in those portions of photo-curable compositions which light has sufficiently penetrated. In order to see whether or not a sufficient curing has taken place, it is required, for example, to directly touch or cut the back surface of a cured product which is opposite to the surface irradiated with light.

Meanwhile, there is an attempt to see a photo-curing degree by incorporating an optically color-changing photo-initiator into a photo-curable material. However, this attempt involves the following defect to overcome. For example, a composition curable by visible light generally contains camphorquinone or allyl ketone as a photo-initiator, and in general, an optically color-changing compound additionally incorporated increases the coloring degree and reduces the light transmission property. Eventually, the photo-curability is deteriorated.

It is an object of the present invention to provide a novel photo-curable resin composition.

It is another object of the present invention to provide a photo-curable resin composition which is advantageously usable not only in the dental field but also in general industrial fields.

It is further another object of the present invention to provide a photo-curable resin composition suitably usable for preparing a clasp pattern exhibiting a theoretical form for retention, durability, i.e., a cast clasp basic pattern, for producing, by a lost wax method, a cast clasp which is a metal component for holding, retaining and supporting a partial denture.

It is still further another object of the present invention to provide a photo-curable resin composition which contains a visible light photo-initiator and a dye-stuff having specific visible light properties, but which, differing from the above conventional compositions, has high photo-curability.

It is yet another object of the present invention to provide a coating liquid which is coated on a resin pattern before the resin pattern is invested in a non-combustible investment of gypsum, etc., and which can prevent roughening of the inner surface of the investment.

The other objects and advantages of the present invention will be apparent from the following description.

According to the present invention, the above objects and advantages of the present invention are achieved, first, by a photo-curable resin composition (to be sometimes referred to as "present first composition" hereinafter) containing:

(A) 30 to 60 parts by weight of a polycarbonate having a number average molecular weight of between 200 and 10,000 and containing at least two (meth)acrylate groups in the molecule, (B) 40 to 70 parts by weight of an organic polymer fine powder having an average particle diameter of between 1 $\mu$m and 50 $\mu$m, and (C) 0.04 to 4 parts by weight of a photo-radical polymerization initiator.

The above polycarbonate constituting the photo-curable resin composition of the present invention has (meth)acrylate groups such as acrylate groups or methacrylate groups in the molecule, e.g., in the molecule terminal.

The skeleton of the polycarbonate may be aliphatic or aromatic. Examples of the polycarbonate skeleton include an alkylene carbonate group having 2 to 20 carbon atoms and a polycarbonate having a recurring unit of the following formula (1),

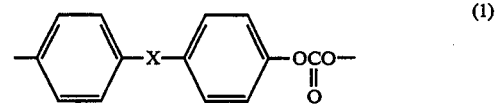

wherein X is an alkylidene group having 1 to 4 carbon atoms, a cyclohexylidene group, —O—, —S—, —SO$_2$— or —CO—.

The number average molecular weight of the above polycarbonate is 200 to 10,000, preferably 300 to 5,000.

Specific examples of the above polycarbonate are a polymer having a structure in which a polycarbonate oligomer having a number average molecular weight of 200 to 10,000 and having terminal hydroxyl groups is esterified with (meth)acrylic acid; a polymer having a structure in which a polycarbonate has a (meth)acrylate group in each of its two terminals through a urethane group and is obtained by allowing a polycarbonate oligomer having a number average molecular weight of 200 to 10,000 and having terminal hydroxyl groups, a (meth)acrylate ester having one or two OH groups and a diisocyanate compound to react at one or two step(s); and a compound obtained by allowing a polycarbonate oligomer having terminal hydroxyl groups and a (meth)acrylate compound having an isocyanate group to react.

The above polycarbonate is used in an amount of 30 to 60 parts by weight, preferably 35 to 55 parts by weight.

Examples of the organic polymer of the organic polymer fine powder (B) are paraffin wax, polyolefins such as polyethylene, polypropylene and polybutylene, polymethyl methacrylate, polyethyl methacrylate, polybutyl, methacrylate, starch and paraformaldehyde.

Preferred are those organic polymers which have an ash content of not more than 1,000 ppm, more preferably not more than 500 ppm.

Further, the number average molecular weight of the organic polymer is preferably 10,000 to 2,000,000, more preferably 20,000 to 1,000,000.

The average particle diameter of the fine powder of the above organic polymer is preferably 1 to 50 μm, more preferably 2 to 40 μm.

The organic polymer fine powder is used in an amount of 40 to 70 parts by weight, preferably 45 to 65 parts by weight.

As the photo-radical polymerization initiator (C), preferred are benzoin alkyl ethers such as benzoin methyl ether and benzoin isopropyl ether; ultraviolet light photo-initiators such as benzophenone and acetophenone; and visible light photo-initiators such as camphorquinone, benzil, Michler's ketone, thioxanthone derivatives. Of these initiators, the last visible light photo-initiators are more preferred, since these give a composition having excellent curability.

The photo-radical polymerization initiator is used in an amount of 0.04 to 4 parts by weight, more preferably 0.1 to 3 parts by weight.

The above photo-curable resin composition of the present invention may further contain a (meth)acrylate type monomer.

The (meth)acrylate type monomer may be a compound which is monofunctional, difunctional or polyfunctional with regard to methacrylate groups. The (meth)acrylate type monomer is selected, for example, from monofunctional (meth)acrylates such as methyl methacrylate, ethyl methacrylate, butyl methacrylate, hydroxyethyl methacrylate, glyceryl methacrylate and ethylene glycol monomethacrylate; difunctional (meth)acrylates such as ethylene glycol di(meth)acrylate, diethylene glycol di(meth)acrylate, triethylene glycol di(meth)acrylate, polyethylene glycol di(meth)acrylate, diemthacrylate of bisphenol A, diglycidyl methacrylate of bisphenol A, 2,2-bis(4-methacryloxyethoxyphenyl)propane, 2,2-bis(4-methacryloxy(poly)ethoxyphenyl)propane, a condensate of one 2,2,4-trimethylhexamethylenediisocyanate molecule and two hydroxyethyl (meth)acrylate molecules, a condensate of one hexamethylenediisocyanate molecule and two hydroxyethyl (meth)acrylate molecules and phthalic acid diglycidyl (meth)acrylate; and polyfunctional (meth)acrylates such as trimethylolpropane trimethacrylate and pentaerythritol trimethacrylate, although the (meth)acrylate type monomer shall not be limited to the above monomers.

The amount of the above (meth)acrylate type monomer based on the total amount of the above polycarbonate and the (meth)acrylate type monomer is preferably not more than 60% by weight, more preferably not more than 50% by weight.

The above photo-curable resin composition of the present invention may further contain a dyestuff which has a light absorption maximum peak at 400 to 800 nm while dissolved in the composition and which undergoes color change with visible light.

As the above dyestuff, preferred are those dyestuffs which have a light absorption maximum peak at 500 to 800 nm and a light absorption minimum value at 400 to 500 nm while dissolved in the composition and which has an absorbance in the light absorption maximum peak/absorbance in the light absorption minimum value of at least 5. The amount of the dyestuff for use per 100 parts by weight of the composition is preferably 0.0001 to 0.5 part by weight, more preferably 0.0002 to 0.4 part by weight.

Preferred examples of the above dyestuff include Michler's ketone and Crystal Violet.

The composition of the present invention containing the above dyestuff avantageously contains, as the above photo-radical polymerization initiator (C), a compound which undergoes cleavage with visible light to form a radical, particularly a compound having a light absorption maximum peak at 400 to 500 nm.

The above initiator includes camphorquinone, benzil, 3-ketocoumarin, 2-methylthioxanthone, 2,4,6-trimethylbenzoyl, diphenylphosphine oxide, and other commercially available photo-initiators.

The photo-curable resin composition of the present invention can be produced by fully stirring and mixing the above three components (A), (B) and (C) optionally together with the (meth)acrylate type monomer and the dyestuff in any order either with time or simultaneously.

According to the present invention, it is made clear that there can be further provided a paste-like photo-curable resin composition (to be sometimes referred to as "present second composition" hereinafter) which shows excellent performances similar to those of the above present first composition and, furthermore, which is excellent in operability.

That is, the present second composition, provided by the present invention, comprises:

(A) 15 to 60 parts by weight of a polycarbonate having a number average molecular weight of between 200 and 10,000 and containing at least two (meth)acrylate groups in the molecule, (B) 20 to 70 parts by weight of a polyolefin fine powder having an average particle diameter of between 1 μm and 50 μm, (C) 0.05 to 4 parts by weight of a photo-radical polymerization initiator, and (D) 2 to 40 parts by weight of a (meth)acrylate-soluble oligomer and/or polymer.

The above polycarbonate (A) can be selected from those described concerning the above present first composition.

The amount of the above polycarbonate for use is 15 to 60 parts by weight, preferably 20 to 55 parts by weight.

Examples of the polyolefin fine powder (B) preferably include fine powders of polyethylene, polypropylene and polybutylene.

The above polyolefin fine powder preferably has a number average molecular weight of 10,000 to 2,000,000, more preferably 20,000 to 1,000,000.

The average particle diameter of the above polyolefin fine powder is 1 to 50 μm, preferably 2 to 30 μm.

The amount of the polyolefin fine powder for use is 20 to 70 parts by weight, preferably 25 to 60 parts by weight.

The photo-radical polymerization initiator (C) is advantageously selected from those described concerning the above present first composition.

The amount of the photo-radical polymerization initiator for use is 0.05 to 4 parts by weight, preferably 0.1 to 3 parts by weight.

Examples of the oligomer and/or polymer (D) having solubility in (meth)acrylates such as methyl methacrylate and ethyl methacrylate include oligomers such as a ketone resin, a xylene resin, an alkyd resin, a petroleum resin, rosin, modified rosin and terpene phenolic resin, and polymers such as polymethyl (meth)acrylate, polyethyl (meth)acrylate, polybutyl (meth)acrylate and polystyrene.

The amount of the above oligomer and/or polymer for use is 2 to 40 parts by weight, preferably 4 to 30 parts by weight.

In addition to the above components (A) to (D), as required, the present second composition may further contain, for example, not more than 5% by weight of a cure promoter selected from amines such as dimethyl-p-toluidine, diethanol-p-toluidine and dimethylaminobenzoic acid and sulfur compounds such as dimethylthiourea and thiobenzoic acid. Further, it may contain not more than 35% by weight of a polyfunctional (meth)acrylate monomer for the purpose of improvement in the hardness of a cured product. Moreover, it may further contain, as required, the same dyestuff as that described concerning the present first composition.

The present second composition generally exhibits a paste-like state. The above components (A) and (B) most greatly contribute to the formation of the paste-like state of the present second composition. The component (D) is effective for the operability of the paste-like composition, particularly for the prevention of deformation of the paste. When the amount of the component (D) is less than 2 parts by weight, no effect is produced. When it is more than 40 parts by weight, the viscosity of the paste is too high, and the shaping performance is poor. When the amount of the component (C) is less than 0.05 part by weight, the effect is insufficient. When it is more than 4 parts by weight, the resultant paste is colored, the cost increases, and the strength of the cured product decreases.

The present second composition can be produced by fully stirring and mixing the above components (A), (B), (C) and (D) in any order either with time or simultaneously.

The present second composition is suitably used for producing a pattern for a dental cast clasp.

That is, the present second composition is excellent not only in operability in the production of a pattern for a cast clasp but also in resin strength and castability. The above description concerns the case where the composition of the present invention is mainly used in a dental cast product. However, the composition of the present invention can be also used in general industrial fields as described above.

According to the present invention, as another photo-curable resin composition (to be sometimes referred to as "present third composition" hereinafter), there is similarly provided a photo-curable resin composition which comprises:

(A) 30 to 60 parts by weight of diglycidyl phthalate (meth)acrylate of the formula (2),

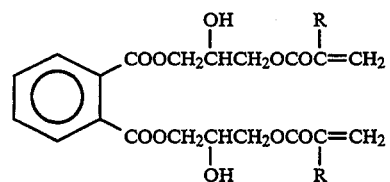

wherein R is a hydrogen atom or a methyl group, (B) 40 to 70 parts by weight of an organic polymer fine powder having an average particle diameter of between 1 μm and 50 μm, and (C) 0.04 to 6 parts by weight of a photo-radical polymerization initiator.

In the present third composition, diglycidyl phthalate (meth)acrylate (A) is the compound of the above formula (2). The amount of the diglycidyl phthalate (meth)acrylate for use is 30 to 60 parts by weight, preferably 35 to 55 parts by weight.

As an organic polymer of the organic polymer fine powder (B), preferred are those which have no solubility or very small solubility in diglycidyl phthalate (meth)acrylate. Examples of the organic polymer preferably are paraffin wax, polymethyl methacrylate, polyethyl methacrylate, polybutyl methacrylate, starch and paraformaldehyde.

Preferred are those organic polymers which have an ash content of not more than 1,000 ppm, more preferably not more than 500 ppm.

Further, the number average molecular weight of the organic polymer is preferably 10,000 to 2,000,000, more preferably 20,000 to 1,000,000.

The average particle diameter of the fine powder of the above organic polymer is preferably 1 to 50 μm, more preferably 2 to 30 μm.

The organic polymer fine powder is used in an amount of 40 to 70 parts by weight, preferably 45 to 65 parts by weight.

The photo-radical polymerization initiator (C) is freely selected from known photo-radical polymerization initiators. Preferred are camphorquinone, benzil, benzoyl methyl ether, benzoyl isopropyl ether, a thioxanthone derivative, benzophenone and acetophenone. In addition to these, a polymerization promoter and a stabilizer may be further used. As required, a radical-polymerizable monomer other than the above component (A) may be used in an amount of not more than 40 parts by weight per 100 parts by weight of the total amount of the components (A) and (B).

The amount of the photo-radical polymerization initiator for use per 100 parts by weight of the total amount of the component (A) and (B) is 0.04 to 6 parts by weight, preferably 0.1 to 4 parts by weight.

The present third composition may further contain the same dyestuff as that described concerning the present first composition.

The present third composition can be produced by fully stirring and mixing the above components (A), (B) and (C) optionally together with the dyestuff in any order either with time or simultaneously.

Further, the following has been made clear: The coating liquid provided by the present invention is applied to a resin pattern before the investing of the resin pattern in a noncombustible investment such as gypsum, whereby the coating liquid, regardless of the kind of the resin pattern, can prevent roughening of the inner surface of the investment at the time when the resin pattern is subjected to combustion together with the investment.

That is, the coating liquid of the present invention can achieve the same effect as that of the above present first, second and third compositions with regard to the prevention of roughening of the inner surface of an investment.

The above coating liquid of the present invention is a coating liquid to be applied to a resin pattern, which is to be fired while invested in a noncombustible investment, before the investing of the resin pattern, the coating liquid comprising a solution containing:

(A) at least one wax selected from natural wax and synthetic wax, and (B) at least one solvent selected from an aliphatic hydrocarbon and an aromatic hydrocarbon, the solution containing, based on the total weight of the above components (A) and (B), 95 to 60% by weight of the component (B) and 5 to 40% by weight of the component (A).

The coating liquid of the present invention particularly has a characteristic feature in that even when a rapidly curable polyfunctional acrylic monomer as above is used as a resin for a pattern, no roughening of the inner surface of an investment after incineration occurs, and consequently, there is provided an excellent cast product.

The coating liquid of the present invention is produced by dissolving the wax (A) in the solvent (B).

The wax (A) is a natural wax or a synthetic wax. The natural wax refers to an ester of a fatty acid and either water-insoluble higher monohydric alcohol or water-insoluble higher dihydric alcohol, i.e., a wax in a usual sense. The synthetic wax refers, for example, to a paraffin wax, a microcrystalline wax and petrolatum, i.e., those commonly called petroleum wax.

As the wax (A), one or more waxes selected from the above natural waxes and synthetic waxes is/are used.

The solvent (B) is an aliphatic hydrocarbon or an aromatic hydrocarbon.

As an aliphatic hydrocarbon, for example, a linear or branched aliphatic hydrocarbon is preferred, and a saturated hydrocarbon having 5 to 10 carbon atoms is more preferred.

Examples of the above aliphatic hydrocarbon include hydrocarbons having high volatility at room temperature such as pentane, hexane, heptane, octane and petroleum naphtha.

Examples of the above aromatic hydrocarbon preferably include benzene, toluene, o-xylene, m-xylene and p-xylene.

The above solvents may be used alone or in combination.

The coating liquid of the present invention is produced by dissolving 5 to 40% by weight, based on the total weight of the wax (A) and the solvent (B), of the wax (A) in the solvent (B). The amount of the wax (A) is preferably 15 to 30% by weight.

The coating liquid of the present invention may, as required, further contain 0.1 to 15 parts by weight, per 100 parts by weight of the coating liquid, of a radical initiator and a radical polymerization promoter.

The coating liquid of the present invention is coated on a resin pattern to be invested in an investment. The resin forming the resin pattern may be a thermoplastic resin, a thermosetting resin, a photo-curable resin or a mixture of these.

For example, when the resin pattern is a relatively small pattern such as a pattern for dental use, preferred is a photo-curable resin or a resin mixture containing a photo-curable resin.

As a photo-curable resin, for example, preferred are polyfunctional acrylic resins such as di(3-acryloxy-2-hydroxypropyl)phthalate and polycarbonate-based urethane acrylate.

The resin pattern is fired while it is invested in an investment. Therefore, the investment is required to be formed of a noncombustible material. The noncombustible material is selected from inorganic materials such as gypsum, alumina and silicic acid- or phosphoric acid-based materials. A casting metal is cast into a space formed by the resin pattern which has been incinerated in the investment, whereby a cast product is obtained.

For example, when a gypsum investment is used, the temperature of about 700° C. is an optimum for casting a casting metal, and when a phosphoric acid-based investment is used, the temperature of about 800° C. is an optimum for a casting a casting material. Therefore, a gold/silver/palladium alloy for which the optimum casting temperature is about 700° C. is advantageously used with a gypsum investment, and a cobalt/chromium alloy for which the optimum casting temperature is about 800° C. is advantageously used with a phosphorus acid-based investment.

A resin pattern coated with the coating liquid of the present invention does not roughen the inner surface of an investment when incinerated in the investment, and eventually, the coating liquid of the present invention greatly contributes to the production of a cast product having a smooth surface.

The present invention will be described in detail hereinafter by reference to Examples. The present invention, however, shall not be limited to these Examples.

EXAMPLE 1

0.7 Gram of a polycarbonate having acrylate groups ($CH_2$=CHCOO—) in the molecule terminals (Art resin UN9200S, supplied by Negami Kogyo K.K.), 0.3 g of diglycidyl phthalate methacrylate (Denacol DA721, supplied by Nagase Kasei K.K.), 0.6 g of polymethyl methacrylate (Hipearl D250M, supplied by Shin-Nakamura Chemical Co., Ltd.) and 0.002 g of hydroquinone were mixed with a spatula, and the mixture was heated at 76° C. for 30 minutes to form a viscous paste. Then, 1.3 g of a paraffin wax (LUVAX0321, supplied by Nippon Seiro K.K.), 0.16 g of camphorquinone and 0.016 g of dimethyl-p-toluidine were mixed with above paste, and the resultant mixture was defoamed under vacuum to give a paste-like composition.

EXAMPLE 2

0.5 Gram of a polycarbonate having acrylate groups in the molecule terminals (Art resin UN9200A, supplied by Negami Kogyo K.K.), 0.5 g of triethylene glycol dimethacrylate, 2.4 g of a paraffin wax (LUVAX0321, supplied by Nippon Seiro K.K.), 0.001 g of hydroquinone, 0.017 g of camphorquinone and 0.017 g of dimethyl-p-toluidine were mixed with a spatula, and the mixture was defoamed under vacuum to give a paste-like composition.

EXAMPLE 3

1 Gram of a polycarbonate having acrylate groups in the molecule terminals (UN9200S, supplied by Negami Kogyo K.K.), 1 g of a paraffin wax (LUVAX0321, supplied by Nippon Seiro K.K.), 0.3 g of corn starch, 0.001 g of hydroquinone, 0.017 g of camphorquinone and 0.017 g of dimethyl-p-toluidine were mixed with a spatula, and the mixture was defoamed under vacuum to give a paste-like composition.

COMPARATIVE EXAMPLE 1

10 Grams of urethane type acrylate (Art resin SH100, supplied by Negami Kogyo K.K.), 5 g of polymethyl methacrylate (Hipearl D250M, supplied by Shin-Nakamura Chemical Co., Ltd.), 0.05 g of camphorquinone, 0.05 g of dimethylaminoethyl methacrylate and 0.003 g of di-tert-butylhydroxytoluene were mixed with a spatula, and the mixture was defoamed under vacuum to give a paste-like composition.

EXAMPLE 4

Each of the paste-like compositions obtained in Examples 1 to 3 and Comparative Example 1 was, separately from the others, wrapped around the side surface of a cylinder having a 0.5 mm undercut and having a diameter of 5 mm until the resultant winding covered ¾ of the surface. Then, each wrapping composition was irradiated with a light irradiator (for dental use, α-Light, supplied by K.K. Morita) for 5 minutes, taken from the cylinder along the undercut portion, and invested in a gypsum investment (White vest M, supplied by Tokuyama Soda Co., Ltd.). And cast products were prepared from a dental gold/silver/palladium alloy according to a conventional method. Table 1 shows the surface state and surface roughening of each cast product.

TABLE 1

| Composition | Surface state of cast product | Deformation of cast product |
| --- | --- | --- |
| Example 1 | excellent | nil |
| Example 2 | excellent | nil |
| Example 3 | excellent | nil |
| Comparative Example 1 | poor | nil |

EXAMPLE 5

10 Grams of a polycarbonate having acrylate groups in the molecule terminals (UN9000S, supplied by Negami Kogyo K.K.), 1 g of polyethyl methacrylate (Hipearl D-250EL, supplied by Shin-Nakamura Chemical Co., Ltd.) and 0.008 g of hydroquinone were mixed in a polyethylene container with a spatula, and the mixture was heated in an oven at 76° C. for 15 minutes, and cooled. Then, 16 g of a paraffin wax powder (LUVAX1266, supplied by Nippon Seiro K.K.), 0.27 g of camphorquinone and 0.14 g of dimethylamino-p-toluidine were mixed with the above mixture with a spatula, and the resultant mixture was defoamed under vacuum to give a paste-like composition.

EXAMPLE 6

7 Grams of a polycarbonate having acrylate groups in the molecule terminals (UN9000SM, supplied by Negami Kogyo K.K.), 3 g of triethylene glycol dimethacrylate, 3 g of polymethyl methacrylate (Hipearl D-250EL, supplied by Shin-Nakamura Chemical Co., Ltd.) and 0.008 g of hydroquinone were mixed in a polyethylene container with a spatula, and the mixture was heated in an oven at 76° C. for 15 minutes, and cooled. Then, 17 g of a paraffin wax powder (LUVAX1151, supplied by Nippon Seiro K.K.), 0.3 g of camphorquinone and 0.15 g of dimethyl-p-toluidine were mixed with the above mixture with a spatula, and the resultant mixture was defoamed under vacuum to give a paste-like composition.

EXAMPLE 7

7.5 Grams of a polycarbonate having acrylate groups in the molecule terminals (UN9000SM, supplied by Negami Kogyo K.K.), 2.5 g of trimethylolpropane trimethacrylate, 1 g of acrylpolyol (product prepared by distilling volatiles off from Hitaloid 3004 supplied by Hitachi Kasei K.K.) and 0.008 g of hydroquinone were mixed with a spatula, and the mixture was heated in an oven at 76° C. for 30 minutes and cooled. Then, 22 g of a paraffin wax powder (LUVAX1226, supplied by Nippon Seiro K.K.), 0.33 g of camphorquinone and 0.16 g of dimethylamino-p-toluidine were mixed with the above mixture with a spatula, and the resultant mixture was defoamed under vacuum to give a paste-like composition.

EXAMPLE 8

(1) 10 Grams of a hexamethylene carbonate oligomer (Desmophene 2020E, supplied by Bayer Japan), 1.85 g of methacryloyloxyethyl isocyanate (supplied by Nippon Denko K.K.), 0.012 g of di-n-butyltin dilaurate and 0.001 g of hydroquinone were dissolved in 5 ml of tetrahydrofuran, and stirred and mixed at room temperature for 4 days. Then, tetrahydrofuran was removed at room temperature under reduced pressure to give a white semi-solid precipitate. The precipitate was measured for 1R to show that the absorption at $cm^{-1}$ derived from -NCO had disappeared and urethanation took place.

(2) 1 Gram of the reaction product obtained in the above (1), 1 g of a polycarbonate having acrylate groups in the molecule terminals (UN9000SM, supplied by Negami Kogyo K.K.). 0.5 g of trimethylolpropane trimethacrylate, 0.25 g of polymethyl methacrylate (Hipearl D-250M, supplied by Shin-Nakamura Chemical Co., Ltd.) and 0.002 g of hydroquinone were mixed with a spatula, and the mixture was heated in an oven at 76° C. for 30 minutes and cooled. Then, 2.75 g of a paraffin wax powder (Flowcene UF80, supplied by Sumitomo Seika K.K.), 0.055 g of a photo-initiator (Darocure 1664, supplied by Merck Co.) and 0.03 g of dimethyl-p-toluidine were mixed with the above mixture, and the resultant mixture was defoamed under vacuum to give a paste-like composition.

EXAMPLE 9

8 Grams of UN9000S, 2 g of trimethylolpropane trimethacrylate, 1.0 g of polyethyl methacrylate (Hipearl D-250EL, supplied by Shin-Nakamura Chemical Co., Ltd.), 2 g of a polycarbonate oligomer (Desmophene 2020E, supplied by Sumitomo-Bayer Urethane K.K.) and 0.008 g of hydroquinone were mixed in a polyethylene container with a spatula, and the mixture was heated in an oven at 76° C. for 30 minutes, stirred and cooled. Then, 15.5 g of a paraffin wax powder (Flowcene UF80, supplied by Sumitomo Seika K.K.), 0.055 g of camphorquinone and 0.03 g of dimethyl-p-toluidine were mixed with the above mixture with a spatula, and the resultant mixture was defoamed under vacuum to give a paste-like composition.

COMPARATIVE EXAMPLE 2

10 Grams of urethane type acrylate (Art resin U108A, supplied by Shin-Nakamura Chemical Co., Ltd.), 5 g of a polymethyl methacrylate powder (Hipearl D250M, supplied by Shin-Nakamura Chemical Co., Ltd.), 0.05 g of camphorquinone, 0.05 g of dimethylaminoethyl methacrylate and 0.003 g of di-tert-butylhydroxytoluene were mixed with a spatula, and the mixture was defoamed under vacuum to give a paste-like composition.

EXAMPLE 10

Each of the paste-like compositions obtained in Examples 5 to 9 and Comparative Example 2 was, separately from the others, wrapped around the side surface of a base prepared by cutting a 0.5 mm undercut in a brass bar having a diameter of 5 mm until the resultant wrapping formed a tube having 3/4 windings of the composition. Then, each wrapping composition was irradiated with a light irradiator (for dental use, α-Light, supplied by K.K. Morita) for 5 minutes, taken from the bar along the undercut portion, and invested in a gypsum investment (Cristobalite, supplied by Tokuyama Soda Co., Ltd.) or a phosphate-based investment (Univest Silky, supplied by Shofutoshi K.K.). And cast products were prepared from a gold/silver/palladium alloy according to a conventional method, and examined on the surface state and surface roughening. Table 2 shows the results.

TABLE 2

| Composition | Operability as paste | Use with gypsum investment | | Use with phosphate investment |
|---|---|---|---|---|
| | | Deformation | Cast surface state | Cast surface state |
| Example 5 | good | nil | excellent | excellent |
| Example 6 | good | nil | excellent | excellent |
| Example 7 | good | nil | good | good |
| Example 8 | good | nil | good | good |
| Example 9 | good | nil | excellent | excellent |
| Comparative Example 2 | sticky, poor shaping performance | | poor, roughened | slightly poor, slightly roughened |

EXAMPLE 11

1 Gram of diglycidyl phthalate acrylate (Denacol DA721, supplied by Nagase Kasei K.K.), 0.6 g of polymethyl methacrylate (Hipearl D-250M, supplied by Shin-Nakamura Chemical Co., Ltd.), 0.65 g of a paraffin wax powder (Flowcene UF80, supplied by Nippon Seiro K.K.), 0.002 g of hydroquinone, 0.01 g of camphorquinone and 0.01 g of dimethyl-p-toluidine were mixed with a spatula, and the mixture was defoamed under vacuum to give a paste-like composition.

EXAMPLE 12

1 Gram of diglycidyl phthalate acrylate, 0.6 g of polymethyl methacrylate (Hipearl D-250M, supplied by Shin-Nakamura Chemical Co., Ltd.), 0.45 g of a crosslinked polymethyl methacrylate product (Hipearl TM-150, supplied by Shin-Nakamura Chemical Co., Ltd.), 0.25 g of a paraffin wax powder (LUVAX0321, supplied by Nippon Seiro K.K.), 0.01 g of camphorquinone and 0.01 g of dimethyl-p-toluidine were mixed with a spatula, and the mixture was defoamed under vacuum to give a paste-like composition.

EXAMPLE 13

Each of the paste-like compositions obtained in Examples 11 and 12 was, separately from the others, wrapped around the side surface of a cylinder having a 0.5 mm undercut and having a diameter of 5 mm until the resultant winding covered ¾ of the surface. Then, each wrapping composition was irradiated with a light irradiator (for dental use, α-Light, supplied by K.K. Morita) for 5 minutes, taken from the cylinder along the undercut portion, and invested in a gypsum investment (White vest M, supplied by Tokuyama Soda Co., Ltd.). And cast products were prepared from a dental gold-/silver/palladium alloy according to a conventional method. Table 1 shows the operability of each composition and the surface state and surface roughening of each cast product.

TABLE 3

| Composition | Operability as paste | Surface state of cast product | Deformation of cast product |
|---|---|---|---|
| Example 11 | good | good | nil |
| Example 12 | good | good | nil |

EXAMPLE 14

(1) 44 Parts by weight of di (3-acryloxy-2-hydroxypropyl)phthalate (Danacol DA721, supplied by Nagase Sangyo, K.K.), 27 parts by weight of a polymethyl methacrylate (PMMA) powder, 29 parts by weight of an ultrahigh molecular weight polyolefin powder (Miperon, supplied by Mitsui Petrochemical Industries, Ltd.), 0.5 part by weight of camphorquinone and 1 part by weight of N,N-dimethyl-p-toluidine were mixed with a vacuum stirrer to form a paste-like composition.

(2) A square hole having a size of 10 mm by 10 mm was made through a Teflon base having a thickness of 1.5 mm, and a glass plate was attached to the reverse surface of the base. The paste-like composition obtained in the above (1) was filled in the hole, and another glass plate was pressed on the top surface of the base. The composition was irradiated with a light irradiator (for dental use, α-Light, supplied by K.K. Morita) for 5 minutes to give a cured product. A solution prepared by dissolving 20 parts by weight of a wax (WEISSEN0453, supplied by Nippon Seiro K.K.) in a mixed solvent containing 72 parts by weight of benzene and 8 parts by weight of hexane was applied all over the surface of the above cured product with a paintbrush to form one layer, and the cured product was invested in a dental investment (Cristobalite, supplied by Jishi K.K.) by a predetermined method. The dental investment with the cured product invested in it was placed in an electric oven and the cured product was incinerated. Thereafter, a cast product was prepared from a gold/silver/palladium alloy, and the roughening of the cast product surface was examined. Table 4 shows the result.

EXAMPLE 15

(1) 33 Parts by weight of a polycarbonate type urethane acrylate (Art resin UN9000PEP, supplied by Negami Kogyo K.K.), 11 parts by weight of triethylene glycol dimethacrylate, 56 parts by weight of an ultrahigh molecular weight polyolefin powder (Miperon, supplied by Mitsui Petrochemical Industries, Ltd.), 0.5 part by weight of camphorquinone and 1 part by weight of N,N-dimethyl-p-toluidine were mixed in a vacuum stirrer to form a paste-like composition.

(2) A pattern cured product was prepared in the same manner as in Example 13 except that the composition was replaced with the composition obtained in the above (1), and the casting was carried out in the same manner as in Example 13. Table 4 shows the result.

COMPARATIVE EXAMPLE 3

Example 14 was repeated except that no solution of the wax in the benzene/hexane mixed solvent was applied. Table 4 shows the result.

COMPARATIVE EXAMPLE 4

Example 15 was repeated except that no solution of the wax in the benzene/hexane mixed solvent was applied. Table 4 shows the result.

EXAMPLE 16

A pattern cured product was obtained by repeating Example 13 except that the solution of the wax in benzene/hexane mixed solvent was replaced with a solution prepared by dissolving 10 parts by weight of a wax (WEISSEN0453, supplied by Nippon Seiro K.K.) in a mixed solvent containing 85 parts by weight of petroleum benzine and 5 parts by weight of tert-butylperoxybenzoate, and the casting was carried out in the same manner as in Example 14. Table 4 shows the result.

TABLE 4

| Composition | Surface roughening of cast product | Evaluation |
| --- | --- | --- |
| Example 14 | nil | excellent |
| Comparative Example 3 | yes | not good |
| Example 15 | nil | excellent |
| Comparative Example 4 | slightly | good |
| Example 16 | nil | excellent |

What is claimed is:

1. A photo-curable resin composition containing:
(A) 30 to 60 parts by weight of a polycarbonate having a number average molecular weight of between 200 and 10,000 and containing at least two (meth)acrylate groups in the molecule,
(B) 40 to 70 parts by weight of an organic polymer fine powder having an average particle diameter of between 1 $\mu$m and 50 $\mu$m, wherein said organic polymer fine powder is a member selected from the group consisting of fine powders of paraffin wax, polyolefin, starch and paraformaldehyde, and
(C) 0.04 to 4 parts by weight of a photo-radical polymerization initiator.

2. The photo-curable resin composition of claim 1, which further contains a (meth)acrylate monomer in an amount of not more than 60% by weight, based on the total weight of the polycarbonate and the (meth)acrylate monomer.

3. The photo-curable resin composition of claim 1, wherein the organic polymer fine powder has a number average molecular weight of between 10,000 and 2,000,000.

4. The photo-curable resin composition of claim 1, wherein the organic polymer fine powder is a polyolefin fine powder.

5. The photo-curable resin composition of claim 1, wherein the organic polymer fine powder is paraffin wax fine powder.

6. A photo-curable resin composition containing:
(A) 15 to 60 parts by weight of a polycarbonate having a number average molecular weight of between 200 and 10,000 and containing at least two (meth)acrylate groups in the molecule,
(B) 20 to 70 parts by weight of a polyolefin fine powder having an average particle diameter of between 1 $\mu$m and 50 $\mu$m,
(C) 0.05 to 4 parts by weight of a photo-radical polymerization initiator, and
(D) 2 to 40 parts by weight of a (meth)acrylate-soluble oligomer and/or polymer.

7. The photo-curable resin composition of claim 6, wherein the polyolefin fine powder is replaced with paraffin wax fine powder.

8. A photo-curable resin composition containing:
(A) 30 to 60 parts by weight of diglycidyl phthalate (meth)acrylate of the formula (2),

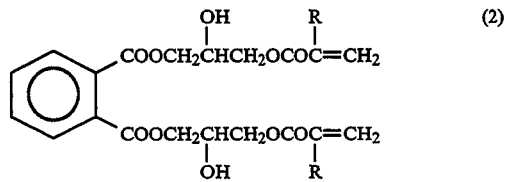

wherein R is a hydrogen atom or a methyl group,
(B) 40 to 70 parts by weight of an organic polymer fine powder having an average particle diameter of between 1 $\mu$m and 50 $\mu$m, wherein said organic polymer fine powder is a member selected from the group consisting of fine powders of paraffin wax, polyolefin, starch and paraformaldehyde, and
(C) 0.04 to 6 parts by weight of a photo-radical polymerization initiator.

9. A photocurable resin composition for use in a lost wax mold method for making molded articles containing:
(A) 30 to 60 parts by weight of a polycarbonate having a number average molecular weight of between 200 and 10,000 and containing at least two (meth)acrylate groups in the molecule,
(B) 40 to 70 parts by weight of an organic polymer fine powder which is a member selected from the group consisting of fine powders of paraffin wax and polyolefin and having an average particle diameter of between 1 $\mu$m and 50 $\mu$m, and
(C) 0.04 to 4 parts by weight of a photo-radical polymerization initiator.

10. The photo-curable resin composition of claim 9 which further contains a (meth)acrylate monomer in an amount of not more than 60% by weight, based on the total weight of the polycarbonate and the (meth)acrylate monomer.

11. The photo-curable resin composition of claim 9, wherein the organic polymer fine powder is a polyolefin fine powder.

12. The photo-curable resin composition of claim 9, wherein the organic polymer fine powder is a paraffin wax fine powder.

13. A photo-curable resin composition for use in a lost wax mold method for making molded articles containing:

(A) 15 to 60 parts by weight of a polycarbonate having a number average molecular weight of between 200 and 10,000 and containing at least two (meth)acrylate groups in the molecule, (B) 20 to 70 parts by weight of an organic polymer fine powder which is a member selected from the group consisting of fine powders of paraffin wax and polyolefin and having an average particle diameter of between 1 μm and 50 μm, (C) 0.04 to 4 parts by weight of a photo-radical polymerization initiator and (D) 2 to 40 parts by weight of an oligomer and/or polymer which is soluble in (meth)acrylate.

14. The photo-curable resin composition of claim 13, wherein the organic fine powder is a polyolefin fine powder.

15. The photo-curable resin composition of claim 13, wherein the organic fine powder is paraffin wax fine powder.

* * * * *